US006626777B1

(12) United States Patent
Gierling

(10) Patent No.: US 6,626,777 B1
(45) Date of Patent: Sep. 30, 2003

(54) DEVICE FOR CONTROLLING AN AUTOMATIC GEARBOX

(75) Inventor: Armin Gierling, Langenargen (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 09/831,036
(22) PCT Filed: Nov. 3, 1999
(86) PCT No.: PCT/EP99/08423
§ 371 (c)(1),
(2), (4) Date: May 3, 2001
(87) PCT Pub. No.: WO00/28242
PCT Pub. Date: May 18, 2000

(30) Foreign Application Priority Data

Nov. 6, 1998 (DE) .......................... 198 51 159

(51) Int. Cl.$^7$ .......................... F16H 55/56; F16H 59/14
(52) U.S. Cl. .......................... 474/18; 474/28
(58) Field of Search .......................... 474/18, 28; 477/48, 477/49

(56) References Cited

U.S. PATENT DOCUMENTS 4,733,582 A    3/1988  Eggert et al. .................. 74/867
5,439,425 A  * 8/1995  Ramm .......................... 477/74
5,961,408 A   10/1999  König et al. .................. 474/18

FOREIGN PATENT DOCUMENTS

| DE | 42 34 103 C2 | 7/1995 |
| DE | 44 36 506 A1 | 4/1996 |
| EP | 0 229 900 A2 | 7/1987 |
| EP | 0 584 457 B1 | 3/1994 |
| GB | 2 252 369 A | 8/1992 |

* cited by examiner

Primary Examiner—Thomas R. Hannon
Assistant Examiner—Justin Stefanon
(74) Attorney, Agent, or Firm—Davis & Bujold, P.L.L.C.

(57) ABSTRACT

The device for controlling a CVT transmission which is connected with a pendulous drive, especially an internal combustion engine for a motor vehicle having front-transverse drive, has a hydromotor simultaneously used as sensor and actuator, the output signal of which is a function of the size and of the dynamics of the engine torque, the same as an electrohydraulic control unit which controls the actuating areas of the primary and secondary pulleys of the CVT via electromagnetic actuating elements and hydraulic valves. In addition to pressure-regulating valves, pressure-reducing valves and at least one emergency valve, the device has a coupling of the hydromotor with the second pressure-reducing valve via a line which coupling is used for torque modulated control of the second pressure-reducing valve in an emergency operating mode.

10 Claims, 2 Drawing Sheets

DEVICE FOR CONTROLLING AN AUTOMATIC GEARBOX

FIELD OF THE INVENTION

Figure 1:
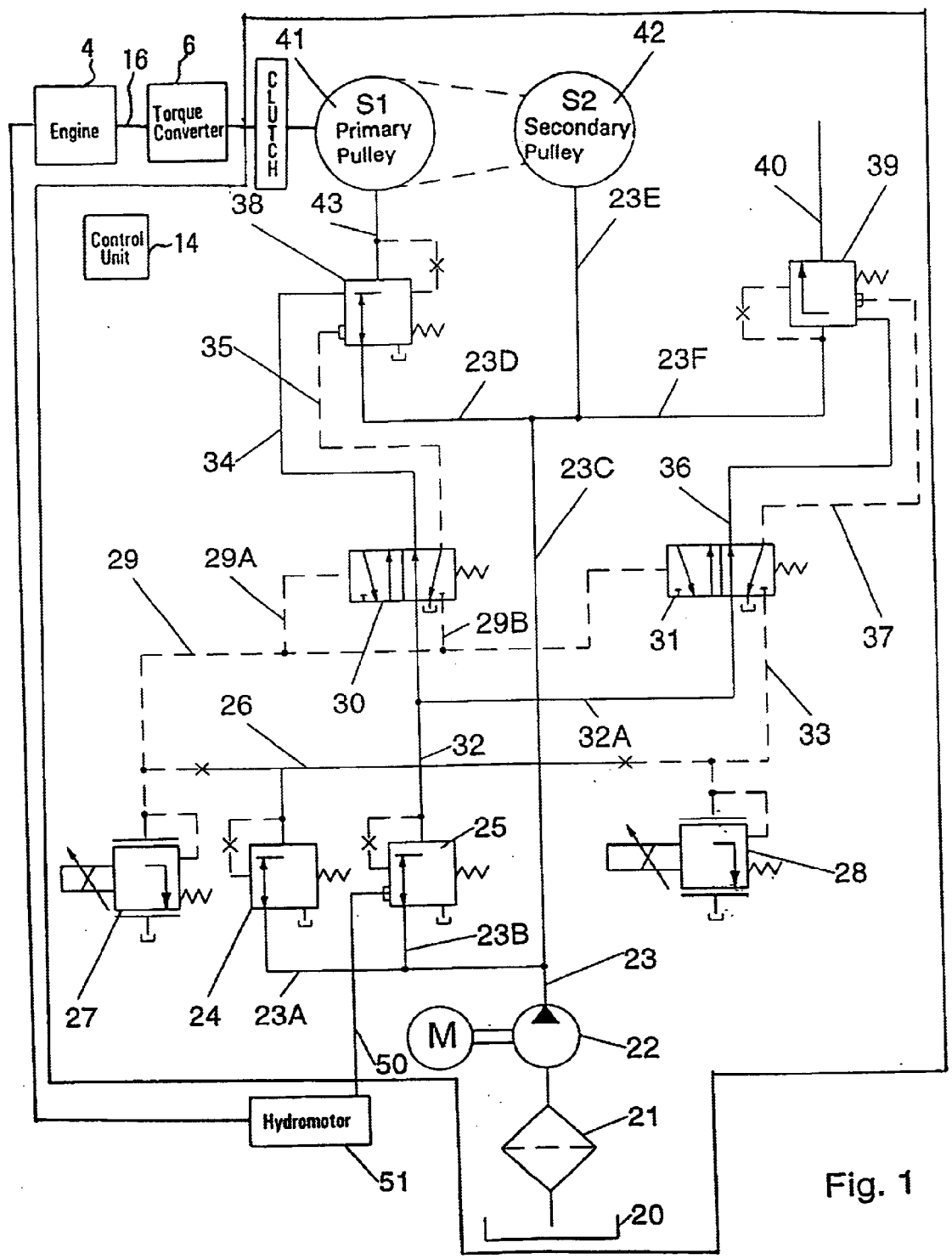

This invention concerns a device for controlling an automatic transmission, in particular of a CVT, which is connected with a pendulous drive, especially an internal combustion engine, for a motor vehicle having front-transverse drive.

BACKGROUND OF THE INVENTION

A CVT is a transmission having a variator for continuous adjustment of the ratio. A known design is a belt-drive variator with a first pulley cone pair upon an input shaft and with a second pulley cone pair upon an output shaft, each pulley cone pair consisting of a first cone stationary in the axial direction and a second cone movable in the axial direction (primary and secondary cones, respectively). Between the pulley cone pairs rotates a belt-drive element, such as a pushing linked band. The primary and secondary cones are adjusted by a pressure medium with the aid of an electronic control unit which, via electromagnetic actuating elements and hydraulic valves, controls the pressure level of the actuating areas of primary and secondary cones.

DE-OS 42 34 103 has disclosed a device for controlling the pressure of the primary cone. The device comprises an electromagnetically controlled primary valve and a hydraulic secondary valve. The primary valve is controlled by an electronic control unit. If the line from electronic control unit to the primary valve is interrupted, the device changes over to emergency operating mode. The pressure level of the primary pulley is determined here by the secondary valve. The position of the secondary valve, in turn, is determined via a mechanical clutch of the primary pulley. This known device has the disadvantages of not covering a complete failure of the electronic control unit.

The Applicant's older German patent application No. P 44 36 506.3 proposed a device for control of a CVT driven by a drive unit in which an electronic control unit determines, via electromagnetic actuating elements and hydraulic valves, the pressure level of the actuating areas, particularly not dynamically balanced, of primary and secondary pulleys and where in case of failure of the electronic control unit an emergency device is activated which has two pressure-regulating valves, two pressure-reducing valves and at least one emergency valve wherein a primary valve and a secondary valve adjust a constant, static pressure ratio and force ratio between primary pulley and secondary pulley during constant static secondary pressure level. By the amount of the static force ratio and of the dynamic forces on the pulley, it is, possible to establish the extent of the ratio change of the CVT from normal operation to emergency operating mode. By emergency operating mode is to be understood the state of a CVT in which no rotational speed regulation and no contact pressure regulation of the secondary pulley occur.

In this known device, the ratio of the CVT changes according to the generated torque of a drive unit, especially of an internal combustion engine, the variable ratio change in emergency operating mode making a reliable start on mountain and an improved driveability at maximum speed possible. As input signal are used, for example, the signal of a load position of the drive unit (throttle valve position in case of an internal combustion engine), the rotational speed of the transmission input shaft, the rotational speed of the output shaft, or the temperature of a pressure medium. An electronic control unit determines from the input signal an operating point and adjusts the appertaining rotational speed value of the transmission input shaft or the ratio of the CVT. If an error occurs, the CVT changes over to emergency operating mode in which there is no longer any rotational speed regulation and any contact pressure regulation of the secondary pulley.

In the emergency operating mode, a pump conveys pressure medium to a first and a second pressure-reducing valve which are respectively connected with a first and a second electromagnetic pressure-regulating valve. Both electromagnetic pressure-regulating valves are, in turn, connected with a first and a second emergency valve, the latter being connected with a primary valve and a secondary valve which, via corresponding lines, are directly connected with the pump. The primary valve determines the pressure level of the actuating area of the primary pulley and the secondary valve determines the pressure level of the actuating area of the secondary pulley. The shifting positions of both emergency valves are determined by the first electromagnetic pressure-regulating valve.

In this known device, however, the need for locating the contact pressure for the corresponding pulleys, according to extreme of the driveability range, is also disadvantageous. Thus, for the capability of the variator of transmitting at low ratio and great input torque, a higher contact pressure on the secondary pulley is required. Subject to the draft of the constant, static pressure ratio between primary pulley and secondary pulley and the selected control of the emergency valves, the adjusted static force on the secondary pulley is constant in the whole torque range, the magnitude depending on the maximum input torque to be transmitted. But in all other operating modes, this results in an overpressure which acts disadvantageously upon the operating temperature with increased loss of efficiency and upon the wear and tear.

EP-A 584 457 has made known a device for regulating the coupling and uncoupling of the master clutch in the transmission of a driving device of a motor vehicle consisting of an engine and an electrohydraulically actuatable automatic transmission wherein to determine the bracing between the driving device and the body, the displacement extent of the input device is measured against the body and fed to a transmission control device which, in specific driving situations, adjusts the control pressure in the master clutch of the transmission in a manner such that the master clutch begins to grind. Instead of the displacement, the extent of torque of the transmission or the information of the supporting force in the step bearings of the driving device may be used. The transmission is constructed as electrohydraulically controllable automatic transmission actuatable, via an electrohydraulic control device, the same as from a sensor for measuring the force in the step bearings for the driving device. With this known device, a master clutch can be exclusively coupled and uncoupled, for example, to reduce shaking when the vehicle is stationary, when gear is introduced and when input wheels are braked.

The invention is based on the problem of providing an emergency drive device for the electrohydraulic, or also only hydraulic control of a CVT transmission, using an input signal equivalent to an engine torque with which the above mentioned overpressing of the variator pulleys is prevented.

SUMMARY OF THE INVENTION

It is proposed, according to the invention, that torque signals of the input unit serve for adjusting a variable pressure level during constant, static pressure ratio between primary and secondary pulleys adjusted by the hydraulic transmission control. The invention is based on the knowledge that the torque generated by the drive unit, that is, the internal combustion engine, must be reinforced. On the reinforcement, by means of a torque support, a signal equivalent to the real input torque can be measured off, that is, a signal equivalent to an engine torque. A preferred example of utilization are aggregate combinations of internal combustion engine and CVT transmission in front-transverse arrangement with pendulous support. The supporting torque can be directly measured on the torque support, e.g. by means of a pressure sensor or a displacement path sensor.

The invention is also based on the knowledge that, in the emergency operating mode, the signal equivalent to the engine torque must be available without limitation, i.e. even in case of complete failure of the electronic control. Especially suitable for the transmission of the engine-torque equivalent signal to the transmission control are hydromotors which can be designed as linear engines or rotary engines and are directly placed on the torque support (for example, the transmission support) of the internal combustion engine and are hydraulically connected with the transmission control.

With the torque-equivalent support torque is modulated the pressure level on the primary and secondary pulleys of the CVT while maintaining the hydraulically established, constant, static pressure ratio.

Subject to the engine-torque equivalent modulation of the pressure level on the secondary pulley in the emergency operating mode, the overpressing can be considerably reduced specifically to a safety value which takes into account the dynamic drive line effects and the tolerances specific to the transmission.

The lowering of the pressure level in the emergency operating mode has a positive influence especially on the temperature level of the CVT, since formerly the enormous overpressure appearing at extreme values of the driveability range in the cooling location. Another positive influence of pressure lowering is the reduced wear of the variator.

One other advantage of the inventive device is the possible use of the engine-torque equivalent pressure also outside the emergency operating mode. The engine-torque equivalent signal can thus be used for direct loading of the secondary pulley and of the clutch valve in order to directly convert hydraulically drive line dynamics. Special advantages here are in the availability of an engine-tolerance dependent size and thereby possible lowering of the overpressure, i.e. the reduction of the safety additions, with the consequence of improvements in efficiency of the transmission.

BRIEF DESCRIPTION OF THE DRAWING(S)

Figure 2:
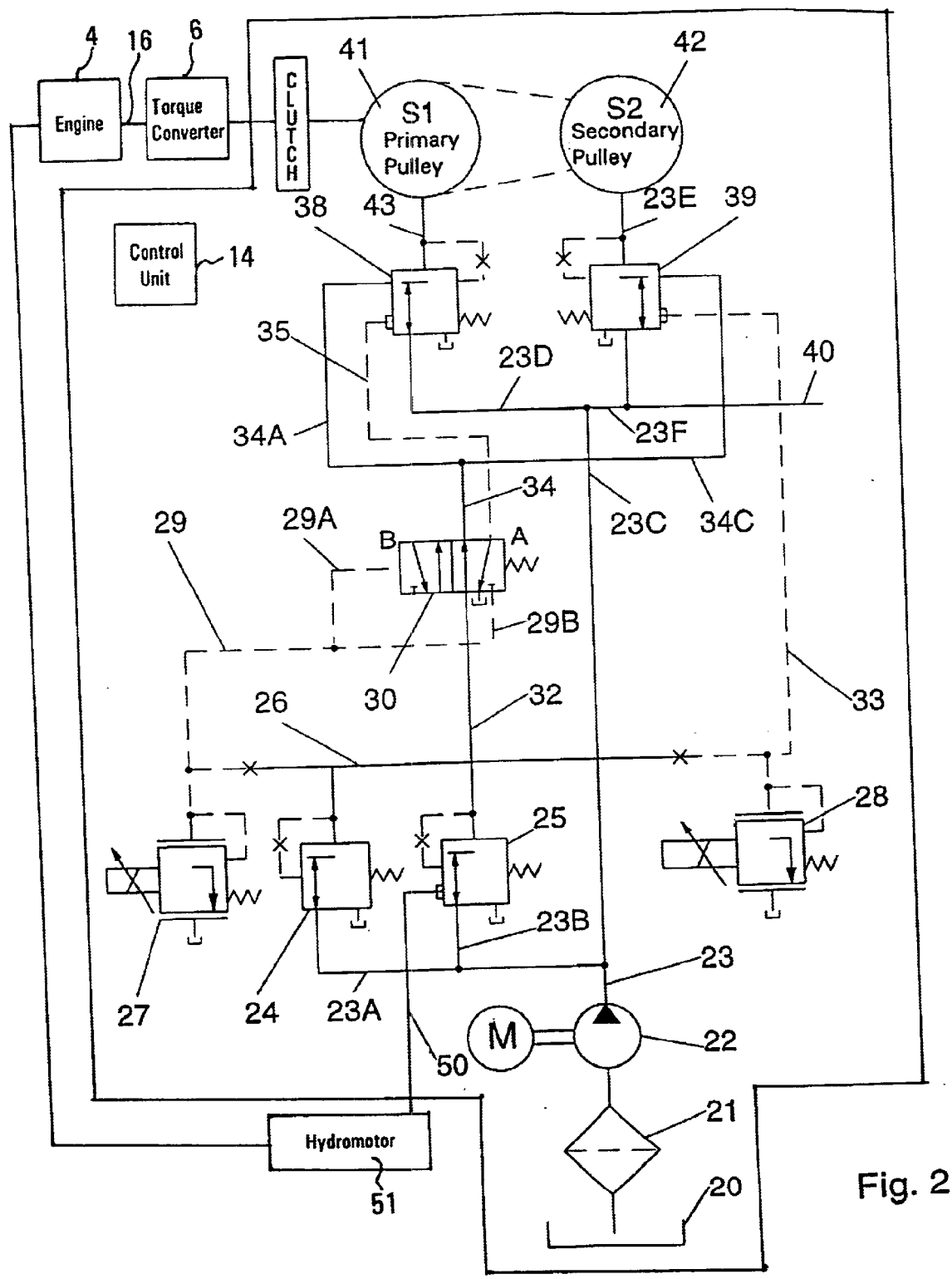

The invention is explained in detail herebelow with reference to the drawings in which two advantageous embodiments are shown. In the drawings:

FIG. 1 is a hydraulic diagram of an inventive control device for a CVT with engine-torque modulated pressure-regulating valve and two emergency valves; and FIG. 2 is a hydraulic diagram of a control device for a CVT with engine-torque modulated pressure-regulating valve and one emergency valve.

DETAILED DESCRIPTION OF THE INVENTION

The CVT 2 (not shown in complete detail), which is connected with a pendulous internal combustion engine 4 in a motor vehicle, having front-transverse drive consists as known of a hydrodynamic torque converter 6 with lock-up clutch, a reversing set, a first pulley cone pair 8, a second pulley cone pair 10, a belt-drive organ 12 and a hydraulic control unit 14. The input shaft 16, connected with the internal combustion engine 4, drives the hydrodynamic converter 6 which, in a conventional manner, has an impeller, a turbine wheel and a stator (not shown). A transmission input shaft drives a reversing set through which the rotational speed of the transmission input shaft is directly transmitted to the first pulley cone pair 8 insofar as a rotational speed reversal for reverse drive does not take place (the Applicant's older German patent application P 44 36 506.3).

In the Figures with S1 is diagrammatically designated the primary pulley and with S2 is diagrammatically designated the secondary pulley or a pulley cone pair. As result of the axial displaceability of primary pulley and secondary pulley, the running radius of the belt-drive organ, only diagrammatically indicated in dotted lines, changes whereby the rotational speed of the transmission shaft or the ratio of the CVT changes.

The CVT is controlled by an electronic control unit, not shown, by means of electromagnetic actuators and hydraulic valves. Via said actuators the clutches and brakes and the respective pressure curves thereof are controlled.

FIG. 1 shows a hydraulic diagram with two emergency valves. A pump 22 driven by the driving unit or by the impeller conveys pressure medium from a lubricant sump 20, via a filter 21, to a line 23. Line 23 has a ramification 23A to a first pressure-reducing valve 24 and a ramification 23B to a second pressure-reducing valve 25. Additionally, from the line 23 branches off a line 23C which is provided with ramifications 23D to a primary valve 38, a ramification 23E to an actuating area 42 of a secondary pulley S2 and a ramification 23F to a secondary valve 39.

To a line 26 is attached a first electromagnetic pressure-regulating valve 27 and a second electromagnetic pressure-regulating valve 28. The pressure in lines 29 and 33 can be adjusted via both pressure-regulating valves 27 and 28.

A first emergency valve 30 and a second emergency valve 31 are connected with line 29 or ramifications 29A and 29B thereof. The first pressure-regulating valve 27 acts via the ramification 29A upon the first emergency valve 30 and via the line 29 upon the second emergency valve 31. Both emergency valves 30 and 31 have a first position A for the emergency operating mode and a second position B. The first emergency valve 30 is connected via lines 34 and 35 with the primary valve 38 which is designed as pressure-reducing valve.

The second emergency valve 31 is connected via lines 36 and 37 with the secondary valve 39 which is designed as a pressure-limiting valve for the secondary side (lines 23 or 23A to 23F). The primary valve 38 adjusts, via the line 43, the pressure level of the adjusting area 41 of the primary pulley S1.

With 51 is designated a hydromotor which can be designed as hydraulic linear motor or hydraulic rotary motor and which is connected, via line 50, with the second pressure-reducing valve 25. The hydromotor 51 is now loaded with the engine-torque equivalent supporting force or the engine-torque equivalent displacement path on the torque support of the engine suspension whereby the pressure-reducing valve 25 is, likewise, indirectly modulated with the engine torque. In the normal driving mode, the primary pulley S1 and the secondary pulley S2 of the CVT are controlled as known via the pressure-regulators 27 and 28 for ratio and contact pressure regulation, the emergency valves 30 and 31 being in position B. In the emergency operating mode, the emergency valves 30 and 31 are in position A whereby the pressure-reducing valve 25, which is located with the engine-torque equivalent pressure of the hydromotor 51, determines the pressure level of primary valve 38 and secondary valve 39.

FIG. 2 shows an embodiment of an inventive device with input-torque modulated pressure-regulating valve for the variator control, the emergency operating mode taking place only via an emergency valve 30. Also with 51 is designated a hydromotor which, in turn, can be designed as hydraulic linear motor or hydraulic rotary motor. The hydromotor 51 is again connected, via line 50, with the second pressure-reducing valve 25. The emergency operating mode of the emergency valve 30 is designated by the position A. The secondary valve 39 for the secondary pulley S2 is designed as pressure-regulating valve. With 40 is designated a line for other consumers loaded with the pump pressure, with 34A the connecting line between the output line 34 of the emergency valve 30 and the primary valve 38 and with 34B the connected line between line 34 and the secondary valve 39.

The pressure-reducing valve 25 is also modulated by the hydromotor 51 with the engine torques.

The differences between both embodiments of FIGS. 1 and 2 are essentially that, in the embodiment shown in FIG. 2, the second emergency valve is eliminated with the secondary valve 39 is designed as a pressure-regulating valve.

By aiming the torque-dependent signal at the hydromotor, therefore, in both embodiments is obtained the adjustment of a variable pressure level with constant static pressure ratio of primary and secondary pulleys.

In the emergency operating mode, the input-torque equivalent signal is available without limitation, that is, even when the electronic control fails completely. The hydraulic signal transmission to the hydraulic transmission control, via the pressure-reducing valve, results in a sturdy system construction wherein, as input variable is used, the engine-torque equivalent signal for the modulation of clutch and variator. The system is independent of the engine control; the capability of emergency running by involving the hydraulic torque signal in the hydraulic system of the transmission in combination with the emergency drive device provided having one or two emergency valves is ensured simultaneously with broad ratio range by constant, static pressure ratio between primary and secondary pulleys of the variator; the torque-dependent contact pressure in the variator during the emergency running operation for reducing the overpressure is ensured by the input-torque modulated pressure-regulating valve.

The device according to the invention, is a hydromotor hydraulically connected via one other line, laid parallel to the line 50 or parallel to the line 32, with a clutch pressure valve for modulation of the clutch pressure with the engine-torque equivalent output signal of the hydromotor.

Reference numerals

| 20 | lubricant sump |
| 21 | filter |
| 22 | pump |
| 23 | line |

-continued

Reference numerals

| 23A | line |
| 23B | line |
| 23C | line |
| 23D | line |
| 23E | line |
| 23F | line |
| 24 | first pressure-reducing valve |
| 25 | second pressure-reducing valve |
| 26 | line |
| 27 | first electromagnetic pressure-regulating valve |
| 28 | second electromagnetic pressure-regulating valve |
| 29 | line |
| 29A | line |
| 29B | line |
| 30 | first emergency valve |
| 31 | second emergency valve |
| 32 | line |
| 32A | line |
| 33 | line |
| 34 | line |
| 34A | line |
| 34B | line |
| 35 | line |
| 36 | line |
| 37 | line |
| 38 | primary valve |
| 39 | secondary valve |
| 40 | line |
| 41 | actuating area of primary pulley |
| 42 | actuating area of secondary pulley |
| 43 | line |
| 50 | line |
| 51 | hydromotor |
| S1 | primary pulley |
| S2 | secondary pulley |

What is claimed is:

1. A device for controlling an automatic transmission of a motor vehicle with a pendulous drive, the automatic transmission having a primary pulley set and a secondary pulley set and the automatic transmission has an electrohydraulic control unit which controls an actuating area of the primary pulley set and an actuating area of the secondary pulley set; and an emergency running device which has first and second pressure-regulating valves, first and second pressure-reducing valves and at least one emergency valve for controlling operation of at least one of the primary and secondary pulley sets during emergency operation of the automatic transmission;

wherein the drive of the vehicle has a torque support which is provided with a sensor which is a hydromotor (51), the hydromotor (51), during operation thereof, is loaded with one of an engine-torque equivalent supporting force and an engine-torque equivalent displacement path of the drive of the torque support and generates a hydraulic output signal which is a function of a size and dynamics of an engine torque of the drive, and the hydromotor (51) is hydraulically connected with the second pressure-reducing valve (25) via a hydraulic line (50) to supply the hydraulic output signal thereto and control operation of the primary and secondary pulley sets during operation of the emergency running device and the hydromotor is located outside of the automatic transmission and directly on the torque support.

2. The device according to claim 1, wherein the hydromotor (51) is a rotary motor.

3. The device according to claim 1, wherein the hydromotor (51) is hydraulically connected with a secondary valve (39) for modulation of a secondary pressure with the engine-torque equivalent output signal of the hydromotor (51).

4. The device according to claim 1, wherein the hydromotor (51) is hydraulically connected with a pressure reducing valve for modulation of a clutch with the engine-torque equivalent output signal of the hydromotor (51).

5. The device according to claim 1, wherein a pump (22) supplies hydraulic fluid to the first and second pressure-reducing valves (24 and 25), an output from the first pressure-reducing valve (24) is coupled to the first pressure-regulating valve (27) and the first pressure-regulating valve (27) supplies a regulating pressure to a primary valve (38) which controls a hydraulic pressure of the actuating area of the primary pulley set (S1), an output from the second pressure-reducing valve (25) is coupled to the second pressure-regulating valve (28) and the second pressure-regulating valve (28) supplies a regulating pressure to a secondary valve (39) which controls a hydraulic pressure of the actuating area of the secondary pulley set (S2).

6. The device according to claim 5, wherein, during operation of the emergency running device, the second pressure-reducing valve (25) supplies a regulating pressure to the primary valve (38) and the secondary valve (39).

7. The device according to claim 5, wherein, during operation of the emergency running device, the second pressure-reducing valve (25) supplies a regulating pressure to the primary valve (38).

8. A device for controlling an automatic transmission of a motor vehicle with a pendulous drive, the automatic transmission having a primary pulley set and a secondary pulley set and the automatic transmission has an electrohydraulic control unit which controls an actuating area of the primary pulley set and an actuating area of the secondary pulley set; and an emergency running device which has first and second pressure-regulating valves, first and second pressure-reducing valves and at least one emergency valve for controlling operation of at least one of the primary and secondary pulley sets during emergency operation of the automatic transmission;

wherein the drive of the vehicle has a torque support which is provided with a sensor which is a hydromotor (51), the hydromotor(51), during operation thereof, is loaded with one of an engine-torque equivalent supporting force and an engine-torque equivalent displacement path of the drive of the torque support and generates a hydraulic output signal which is a function of a size and dynamics of an engine torque of the drive, the hydromotor (51) is hydraulically connected with the second pressure-reducing valve (25) via a hydraulic line (50) to supply the hydraulic output signal thereto and control operation of the primary and secondary pulley sets during operation of the emergency running device, and the hydromotor (51) is a linear motor.

9. A device for controlling an automatic transmission of a motor vehicle with a pendulous drive, the automatic transmission having a primary pulley set and a secondary pulley set and the automatic transmission has an electrohydraulic control unit which controls an actuating area of the primary pulley set and an actuating area of the secondary pulley set; and an emergency running device which has first and second pressure-regulating valves, first and second pressure-reducing valves and a first emergency valve for controlling operation of at least one of the primary and secondary pulley sets during emergency operation of the automatic transmission;

wherein the drive of the vehicle has a torque support which is provided with a sensor which is a hydromotor (51), the hydromotor is located outside of the automatic transmission and directly on the torque support, the hydromotor (51), during operation thereof, is loaded with one of an engine-torque equivalent supporting force and an engine-torque equivalent displacement path of the drive of the torque support and generates a hydraulic output signal which is a function of a size and dynamics of an engine torque of the drive, and the hydromotor (51) is hydraulically connected with the second pressure-reducing valve (25) via a hydraulic line (50) to supply the hydraulic output signal thereto and control operation of the primary and secondary pulley sets during operation of the emergency running device;

a pump (22) supplies hydraulic fluid to the first and second pressure-reducing valves (24 and 25), an output from the first pressure-reducing valve (24) is coupled to the first pressure-regulating valve (27) and the first pressure-regulating valve (27) supplies a regulating pressure to a primary valve (38) which controls a hydraulic pressure of the actuating area of the primary pulley set (S1), an output from the second pressure-reducing valve (25) is coupled to the second pressure-regulating valve (28) and the second pressure-regulating valve (28) supplies a regulating pressure to a secondary valve (39) which controls a hydraulic pressure of the actuating area of the secondary pulley set (S2), and the first emergency valve (30) is located between the first pressure-regulating valve (27) and the primary valve (38).

10. The device according to claim 9, wherein a second emergency valve (31) is located between the second pressure-regulating valve (28) and the secondary valve (39).

* * * * *